US008731886B2

(12) United States Patent
Ryou

(10) Patent No.: US 8,731,886 B2
(45) Date of Patent: May 20, 2014

(54) SIMULATOR FOR ESTIMATING LIFE OF ROBOT SPEED REDUCER

(71) Applicant: Fanuc Corporation, Yamanashi (JP)

(72) Inventor: Engaku Ryou, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 9 days.

(21) Appl. No.: 13/670,699

(22) Filed: Nov. 7, 2012

(65) Prior Publication Data

US 2013/0151214 A1    Jun. 13, 2013

(30) Foreign Application Priority Data

Dec. 13, 2011 (JP) .................... 2011-272101

(51) Int. Cl.
  G05B 19/4065 (2006.01)
  G05B 19/406 (2006.01)
  G05B 19/404 (2006.01)
  G05B 13/04 (2006.01)

(52) U.S. Cl.
  CPC .......... *G05B 19/4065* (2013.01); *G05B 19/406* (2013.01); *G05B 19/404* (2013.01); *G05B 13/048* (2013.01); *G05B 13/04* (2013.01)
  USPC ............................................ 703/7

(58) Field of Classification Search
  CPC .... G05B 13/04; G05B 13/048; G05B 13/042; G05B 13/044; G05B 19/404; G05B 19/406; G05B 19/4065; G05B 19/19; G05B 19/416
  USPC ............................................ 703/7
  See application file for complete search history.

(56) References Cited

U.S. PATENT DOCUMENTS

| 5,587,635 | A | * | 12/1996 | Watanabe et al. | 318/434 |
| 6,163,124 | A | * | 12/2000 | Ito et al. | 318/567 |
| 8,195,429 | B2 | * | 6/2012 | Inoue et al. | 702/184 |
| 2007/0021868 | A1 | | 1/2007 | Nagatsuka et al. | |
| 2009/0043425 | A1 | | 2/2009 | Ito et al. | |
| 2011/0087373 | A1 | | 4/2011 | Nagatsuka et al. | |

FOREIGN PATENT DOCUMENTS

| JP | 62-037703 | 2/1987 |
| JP | 7-107767 A | 4/1995 |
| JP | 11-175130 A | 7/1999 |
| JP | 2007-054942 A | 3/2007 |
| JP | 2009-43165 | 2/2009 |

* cited by examiner

*Primary Examiner* — Kandasamy Thangavelu
*Assistant Examiner* — Jay B Hann
(74) *Attorney, Agent, or Firm* — Drinker Biddle & Reath LLP

(57) ABSTRACT

A simulator (10) for estimating a life of a speed reducer includes a rotation speed and load calculator (21) for simulating the operation program of a robot (12) and calculating the rotation speed of the robot speed reducers (G1-Gm) and the load exerted on the individual speed reducers; a storage (22) for chronologically correlating the rotation speed and the load and storing the rotation speed and the load; a speed reducer life calculator (23) for calculating the life of the individual speed reducers, based on the rotation speed and the load; an operating ratio setter (24) for setting an operating ratio of the robot; and a speed reducer life estimator (25) for estimating the life of the speed reducers, based on the life of the individual speed reducers and the operating ratio.

5 Claims, 6 Drawing Sheets

FIG.2

| SAMPLE NUMBER | 1 | 2 | 3 | 4 | ⋯ | n |
|---|---|---|---|---|---|---|
| SAMPLING PERIOD | t1 | t2 | t3 | t4 | ⋯ | tn |
| ROTATION SPEED (G1) | N(G1)1 | N(G1)2 | N(G1)3 | N(G1)4 | ⋯ | N(G1)n |
| ⋮ | ⋮ | ⋮ | ⋮ | ⋮ | ⋮ | ⋮ |
| ROTATION SPEED (Gn) | N(Gm)1 | N(Gm)2 | N(Gm)3 | N(Gm)4 | ⋯ | N(Gm)n |
| LOAD (G1) | T(G1)1 | T(G1)2 | T(G1)3 | T(G1)4 | ⋯ | T(G1)n |
| ⋮ | ⋮ | ⋮ | ⋮ | ⋮ | ⋮ | ⋮ |
| LOAD (Gn) | T(Gm)1 | T(Gm)2 | T(Gm)3 | T(Gm)4 | ⋯ | T(Gm)n |

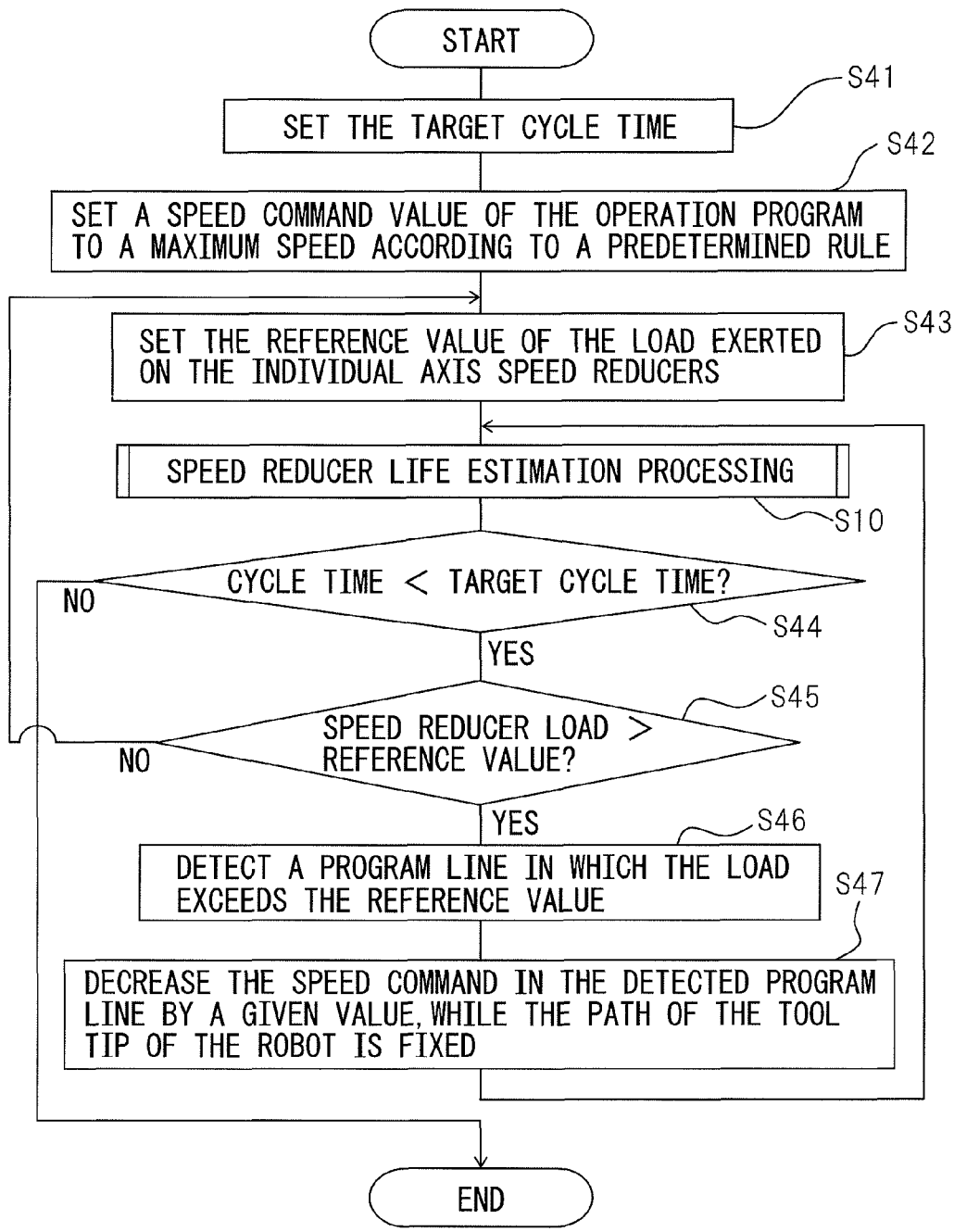

SIMULATOR FOR ESTIMATING LIFE OF ROBOT SPEED REDUCER

RELATED APPLICATION DATA

This application claims priority under 35 U.S.C. §119 and/or §365 to Japanese Application No. 2011-272101 filed Dec. 13, 2011, the entire contents of which are incorporated herein by reference.

BACKGROUND OF THE INVENTION

1. Field of the Invention

The present invention relates to a simulator for estimating life of a robot speed reducer arranged with respect to an individual axis of the robot.

2. Description of the Related Art

In recent years, reduction of the cycle time of a robot system to increase production has been demanded. However, increasing the speed of a robot, leads to a decrease in the life of a speed reducer of the robot. Japanese Unexamined Patent Publication No. 7-107767 discloses monitoring a load exerted on a driving system of a robot to estimate the life of the system.

Adjustment of the operation program of a robot to extend the life of a speed reducer of the robot has also been demanded. Japanese Unexamined Patent Publication No. 2007-054942 discloses correcting a robot operation program made offline. However, correction of the speed and/or the acceleration of a robot in the operation program changes the path of the robot.

Therefore, the corrected operation program is further corrected before the actual use of the corrected program to avoid interference with peripheral devices by the robot. Japanese Unexamined Patent Publication No. 11-175130 discloses resolving deviation in the path of a robot. A method for fixing the path of a robot to allow use of the corrected operation program without further correction has also been demanded.

The present invention has been made in view of the foregoing. It is an object of the present invention to provide a simulator for estimating a life of a robot speed reducer arranged with respect to an individual axis of the robot, based on the robot operation program, and for extending the life of the speed reducer without changing the robot path.

SUMMARY OF THE INVENTION

In order to achieve the object described above, the first mode of the present invention provides a simulator for estimating a life of a robot speed reducer, the simulator including a rotation speed and load calculator for simulating the robot operation program and calculating the rotation speed of the robot speed reducer arranged with respect to an individual axis of the robot, and the load exerted on the speed reducer for each sampling period; a storage for chronologically correlating the rotation speed and the load calculated by the rotation speed and load calculator and storing the rotation speed and the load; a speed reducer life calculator for calculating the life of the robot speed reducer arranged with respect to an individual axis of the robot, based on the rotation speed and the load stored in the storage; an operating ratio setter for setting an operating ratio of the robot or the data that indirectly represent the operating ratio; and a speed reducer life estimator for estimating the life of the speed reducer, based on the speed reducer life calculated by the speed reducer life calculator and the operating ratio set by the operating ratio setter.

In the second mode, the simulator according to the first mode further includes a reference value setter for setting a reference value of the load exerted on the speed reducer; and an evaluator for determining, by using an evaluation function, whether the load calculated by the rotation speed and load calculator exceeds the reference value set by the reference value setter.

In the third mode, the simulator according to the second mode further includes a target life setter for setting a target life of the speed reducer; a path fixer for fixing the path of the tool tip of the robot, regardless of a speed command of the operation program; a maximum speed setter for setting a speed command value of the operation program to a maximum speed according to a predetermined rule, while the path is fixed by the path fixer; and a program changer for determining, by using the evaluation function, whether the load exerted on the speed reducer which the load is chronologically stored in the storage exceeds the reference value which is set as the upper limit by the reference value setter and, when the load exceeds the reference value, for changing the operation program, with the path fixed by the path fixer, to decrease the speed command value of the operation program from the maximum speed by a given value so that the load exerted on the speed reducer is no more than the reference value, wherein the program changer is repeatedly run until the life of the speed reducer reaches the target value set by the target life setter.

In the fourth mode, the simulator according to the third mode further includes a cycle time calculator for multiplying the sample number in the rotation speed and load calculator by the sampling period to calculate the cycle time of the robot operation program, wherein when the cycle time calculated by the cycle time calculator is not reduced after the program changer is repeatedly run until the life of the speed reducer reaches the target value set by the target life setter, a new reference value is set by the reference value setter, and then the program changer is repeatedly run until the life of the speed reducer reaches the target value set by the target life setter.

In the fifth mode, the simulator according to the second mode further includes a cycle time calculator for multiplying the sample number in the rotation speed and load calculator by the sampling period to calculate the cycle time of the robot operation program; a target cycle time setter for setting a target cycle time; a path fixer for fixing the path of the tool tip of the robot, regardless of a speed command of the operation program; a maximum speed setter for setting a speed command value of the operation program to a maximum speed according to a predetermined rule, while the path is fixed by the path fixer; and a program changer for determining, by using the evaluation function, whether the load exerted on the speed reducer which the load is chronologically stored in the storage exceeds the reference value which is set as the upper limit by the reference value setter and, when the load exceeds the reference value, for changing the operation program, with the path fixed by the path fixer, to decrease the speed command value of the operation program from the maximum speed by a given value so that the load exerted on the speed reducer is no more than the reference value, wherein the program changer is repeatedly run until the cycle time calculated by the cycle time calculator reaches the target value set by the target cycle time setter.

In the sixth mode, when the life of the speed reducer is not extended after the program changer in the simulator according to the fifth mode is repeatedly run until the cycle time calculated by the cycle time calculator reaches the target value set by the target cycle time setter, a new reference value is set by the reference value setter, and then the program changer is repeatedly run until the cycle time reaches the target value set by the target cycle time setter.

These and other objects, features, and advantages of the present invention will become more apparent from the detailed description of the typical embodiments of the invention illustrated by the accompanying drawings.

BRIEF DESCRIPTION OF THE DRAWINGS

FIG. 2 is a map of data stored in storage of a simulator for estimating a life of a robot speed reducer according to the present invention;

FIG. 7 is a flowchart which shows the fourth operation of a simulator for estimating a life of a robot speed reducer according to the present invention.

DETAILED DESCRIPTION

The embodiments of the present invention will be described with reference to the accompanying drawings. In the following figures, like references designate similar elements. The scale of the figures is changed as needed to facilitate understanding.

Figure 1:
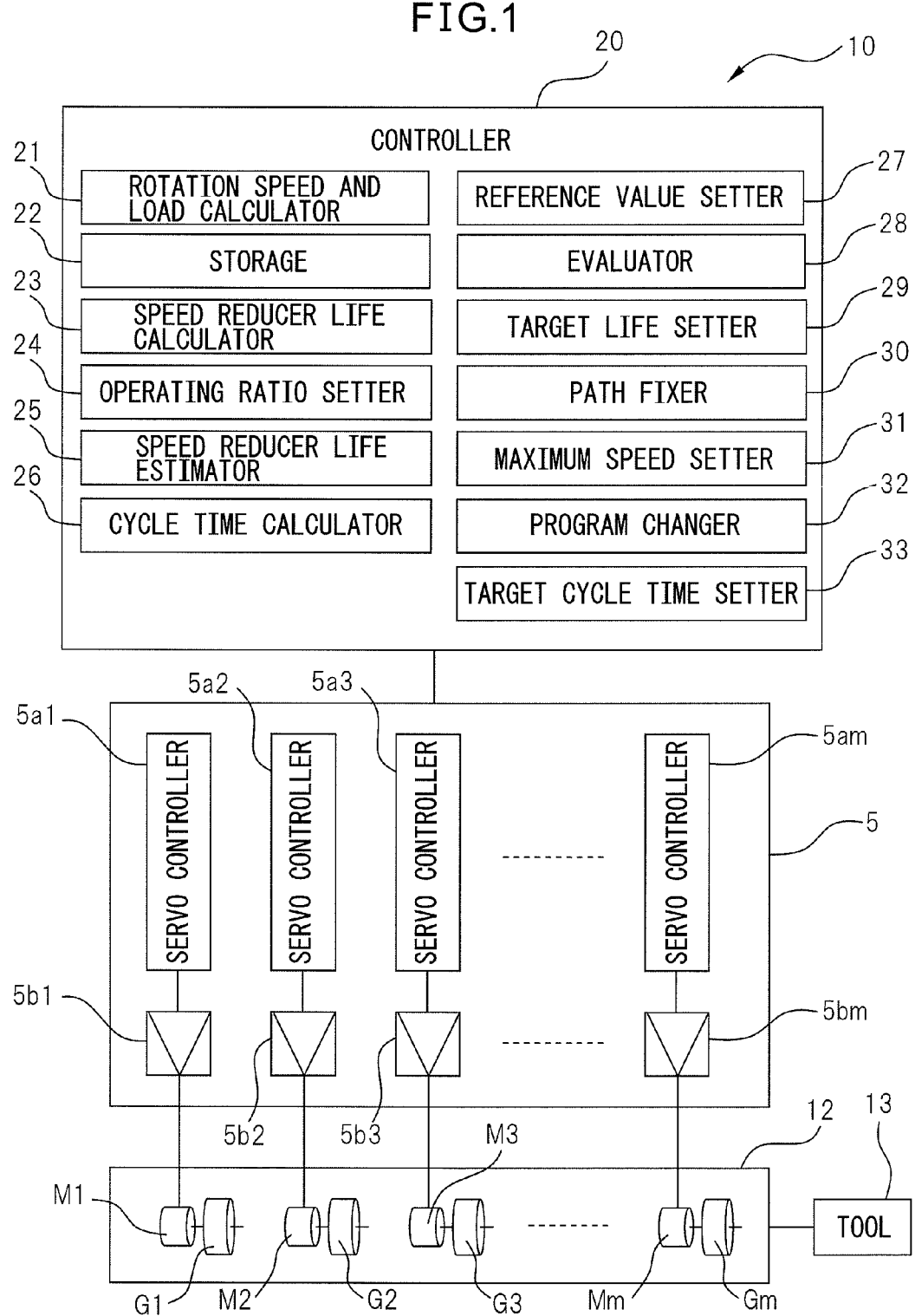
FIG. 1 is a block diagram of a simulator for estimating a life of a robot speed reducer according to the present invention.

FIG. 1 is a schematic diagram of a simulator for estimating a life of a robot speed reducer according to the present invention. FIG. 1 mainly shows a robot 12 such as an articulated robot, and a controller 20 for the robot 12 such as a digital computer.

The robot 12 includes plural servo motors M1-Mm for driving the motion of the individual axes of the robot, and speed reducers G1-Gm connected to the respective servomotors M1-Mm. The speed reducers G1-Gm are sometimes referred to as individual axis speed reducers G1-Gm. A tool 13 is attached to the tip of the robot 12.

The controller 20 serves as a simulator 10 for estimating a life of the individual axis speed reducers G1-Gm. In this application, the life of the speed reducers G1-Gm refers to a run time before the cumulative failure rate of the speed reducers reaches 10%, and it is also referred to as L10 life.

As shown in FIG. 1, a servo controlling unit 5 is disposed between the controller 20 and the robot 12. The servo controlling unit 5 includes plural servo controllers 5a1-5am, wherein m is usually the sum of the number of the axes of the robot and the number of the movable axes of the tool attached to the wrist of the robot, and a processor, a ROM, a RAM, and the like (not shown). The servo controlling unit 5 controls, with loop control, the position and the speed of the servo motors M1-Mm for driving the motion of the individual axes of the robot, as well as the current.

The servo controllers 5a1-5am drive the individual axis servo motors M1-Mm via respective servo amplifiers 5b1-5bm. Although not shown, a position and speed detector is attached to the individual servo motors M1-Mm and the individual speed reducers G1-Gm. The position and the speed of the servo motors detected by the position and speed detector are fed back to the respective servo controllers 5a1-5am.

As shown in FIG. 1, the controller 20 of the simulator 10 for estimating a life of a robot speed reducer includes a rotation speed and load calculator 21 for calculating the rotation speed of the individual axis speed reducers G1-Gm of the robot 12 and the load exerted on the individual axis speed reducers G1-Gm for each sampling period; and a storage 22 for chronologically correlating the rotation speed and the load calculated by the rotation speed and load calculator 21 and storing the rotation speed and the load. The storage 22 includes an operation program of the robot 12, various programs as described in the accompanying flowcharts, and various data.

FIG. 2 is a map of data stored in the storage 22. As shown in FIG. 2, the rotation speed and the load of the individual axis speed reducers G1-Gm which the speed and the load are calculated by the rotation speed and load calculator 21 are stored in a map format, together with the sampling periods.

The controller 20 further includes a speed reducer life calculator 23 for calculating the life of the individual axis speed reducers G1-Gm of the robot 12, based on the rotation speed and the load stored in the storage 22; an operating ratio setter 24 for setting an operating ratio of the robot 12 or the data that indirectly represents the operating ratio; and a speed reducer life estimator 25 for estimating the life of the speed reducer, based on the life of the respective speed reducers which the life is calculated by the speed reducer life calculator 23 and the operating ratio set by the operating ratio setter 24.

The controller 20 further includes a reference value setter 27 for setting a reference value of the load exerted on the individual axis speed reducers G1-Gm; and an evaluator 28 for determining, by using an evaluation function, whether the load calculated by the rotation speed and load calculator 21 exceeds the reference value set by the reference value setter 27.

The controller 20 further includes a target life setter 29 for setting a target life of the speed reducers G1-Gm; a path fixer 30 for fixing the path of the tool tip of the robot, regardless of a speed command of the operation program; a maximum speed setter 31 for setting a speed command value of the operation program to a maximum speed according to a predetermined rule, while the robot path is fixed by the path fixer 30; and a program changer 32 for determining, by using an evaluation function, whether the load chronologically stored in the storage 22 exceeds the reference value which is the upper limit set by the reference value setter 27, and, when the load exceeds the reference value, for changing the operation program with the path fixed by the path fixer 30, to decrease the speed command value of the operation program by a given value so that the load exerted on the individual axis speed reducers G1-Gm is no more than the reference value.

As shown in FIG. 1, the controller 20 includes a cycle time calculator 26 for multiplying the sample number in the rotation speed and load calculator 21 by the sampling period to calculate the cycle time of the operation program of the robot 12; and a target cycle time setter 33 for setting a target cycle time.

Figure 3:
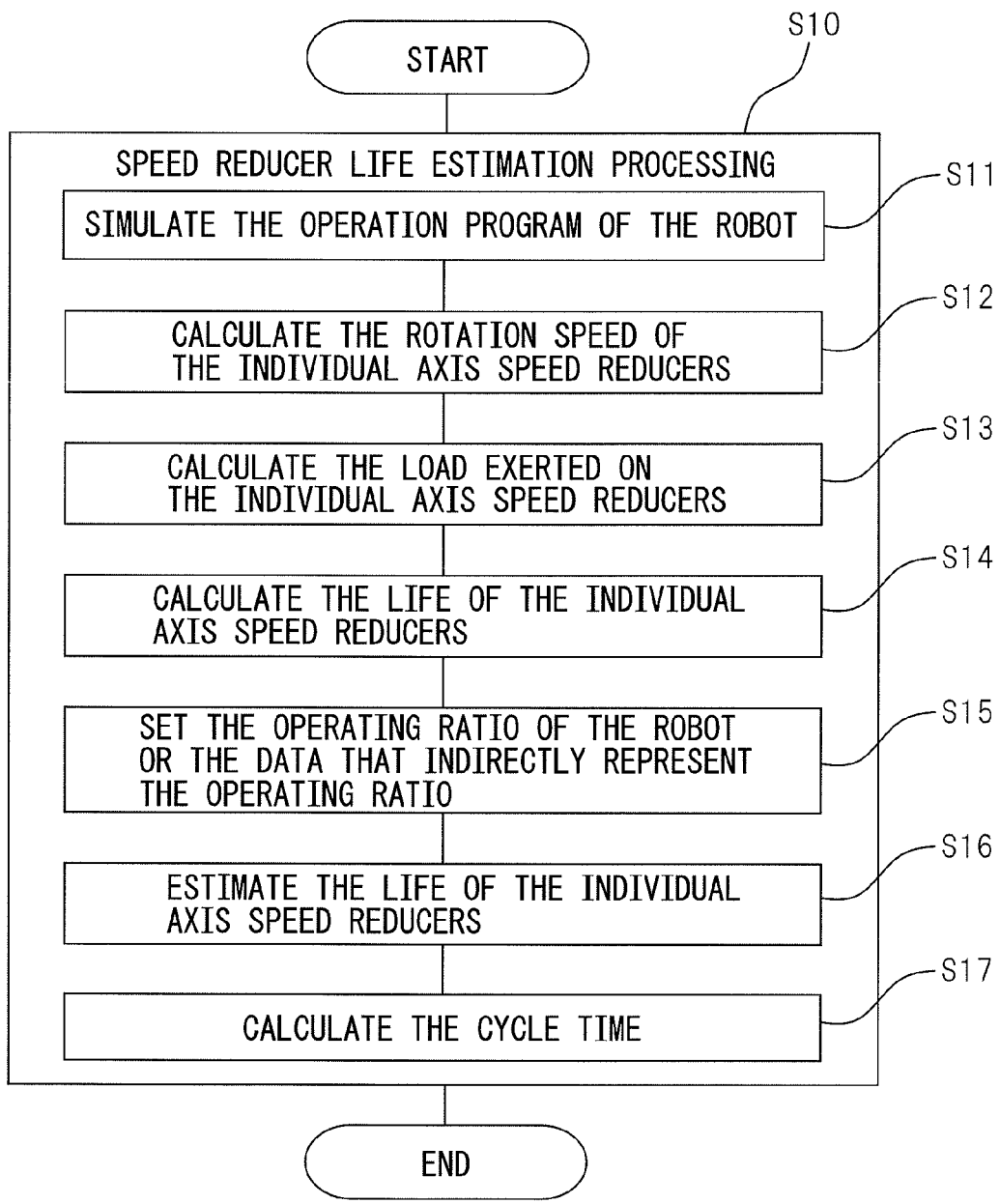
FIG. 3 is a flowchart which shows the first operation of a simulator for estimating a life of a robot speed reducer according to the present invention.

FIG. 3 is a flowchart which shows the first operation of the simulator for estimating a life of a robot speed reducer according to the present invention. As shown in FIG. 3, the simulator 10 for estimating a life of a robot speed reducer according to the present invention performs speed reducer life estimation processing S10 which estimates the life of the individual axis speed reducers G1-Gm included in the robot 12. The speed reducer life estimation processing S10 includes the steps S11-S16 as described below.

In the step S11, the operation program of the robot 12 is simulated. Then in the step S12, the rotation speed and load calculator 21 calculates the rotation speed of the individual axis speed reducers G1-Gm through the simulation. In the step S13, the rotation speed and load calculator 21 also calculates the load exerted on the individual axis speed reducers G1-Gm through the simulation.

The rotation speed and load calculator 21 calculates the rotation speed and the load for each predetermined sampling period until the simulation of the operation program is completed. The calculated rotation speed and load are associated with the sample number and the sampling period as shown in FIG. 2 and sequentially stored in a map format in the storage 22.

Then, in the step S14, the speed reducer life calculator 23 calculates the life of the individual axis speed reducers G1-Gm. More specifically, the speed reducer life calculator 23 calculates the average rotation speed and the average load of the respective speed reducers G1-Gm, based on the following formulas (1) and (2).

Average Torque:

$$T_m = \sqrt[10/3]{\frac{t_1 N_1 T_1^{10/3} + t_2 N_2 T_2^{10/3} + t_3 N_3 T_3^{10/3} + \ldots + t_n N_n T_n^{10/3}}{t_1 N_1 + t_2 N_2 + t_3 N_3 + \ldots + t_n N_n}} \quad (1)$$

Average speed: $N_m = \dfrac{t_1 N_1 + t_2 N_2 + t_3 N_3 + \ldots + t_n N_n}{t_1 + t_2 + t_3 + \ldots + t_n}$ (2)

$t_n$: Sampling period
$N_n$: Rotation speed of speed reducer per unit time (rpm)
$T_n$: Torque of speed reducer per unit time (Nm)

The speed reducer life calculator 23 calculates the speed reducer life L of the individual axis speed reducers G1-Gm, based on the following formula (3).

Speed reducer life:

$$L_h = K \times \frac{N_0}{N_m} \times \left(\frac{T_0}{T_m}\right)^{10/3} \quad (3)$$

K: Rated life (Hour)
$N_0$: Rated speed (Rmp)
$T_0$: Rated torque (Nm)

The multiplier 10/3 varies according to the type of the speed reducers to be used.

Then in the step S15, an operator uses the operating ratio setter 24 to set the operating ratio of the robot 12. For example, if the robot 12 is operated 8 hours a day, the operating ratio is 8/24=1/3. As an alternative to direct setting of the operating time, data which indirectly represent the operating time may be used. Such data include, for example, an operating ratio per day such as 83.3% and the number of cycles of operation per day such as 20,000. Additionally, the operating ratio may be set for the individual speed reducers G1-Gm.

In the step S16, the speed reducer life estimator 25 divides the life of the individual speed reducers G1-Gm calculated by the speed reducer life calculator 23 by the operating ratio to estimate the life of the individual axis speed reducers G1-Gm. In the step S17, the cycle time calculator 26 multiplies the sample number (the maximum value) stored in the storage 22 by the sampling period to calculate the cycle time required to execute the operation program. The calculation of the cycle time by the cycle time calculator 26 may be optionally omitted.

In the present invention, the above process allows accurate estimation of the life of the individual axis speed reducers G1-Gm, and thus preventive maintenance of the individual axis speed reducers G1-Gm can be planned.

Figure 4:
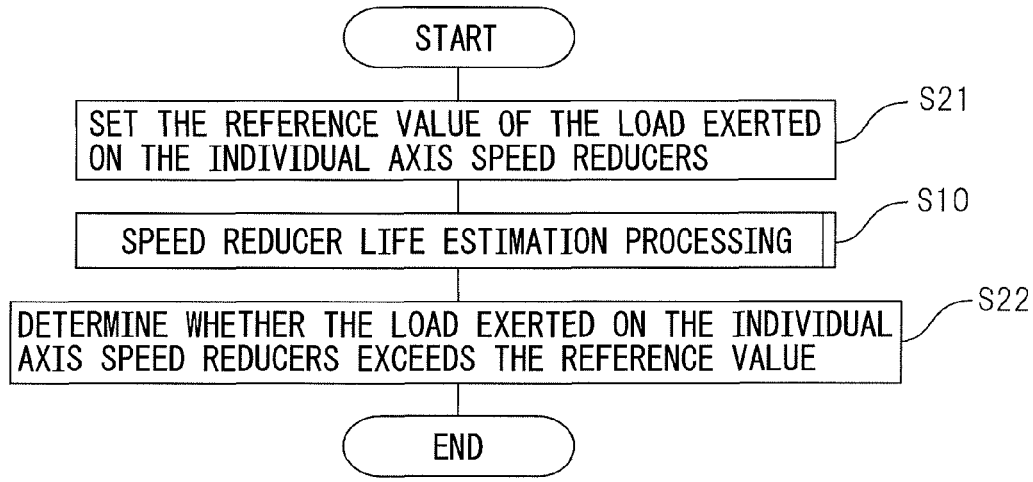
FIG. 4 is a flowchart which shows the second operation of a simulator for estimating a life of a robot speed reducer according to the present invention.

FIG. 4 is a flowchart which shows the second operation of the simulator for estimating a life of a robot speed reducer according to the present invention. In the second operation, an operator uses the reference value setter 27 to set the reference value of the load exerted on the individual axis speed reducers G1-Gm in the step S21. Then, the speed reducer life estimation processing S10 is carried out, as described with reference to FIG. 3. In the processing S10, the load exerted on the individual axis speed reducers is calculated as described above. Only the step 13 may be performed instead of all the steps in the speed reducer life estimation processing S10.

Figure 5A:
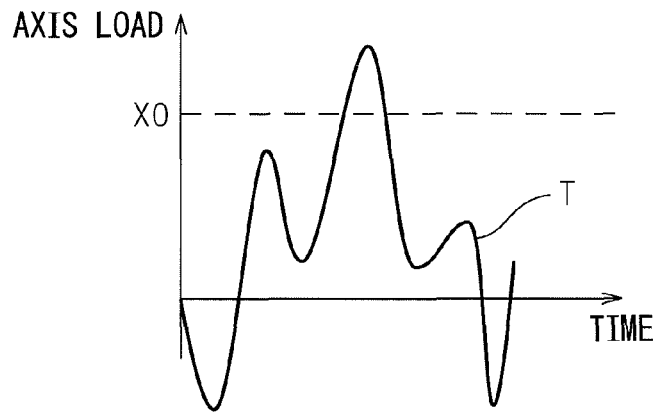
FIG. 5A is a graph which shows the relationship between the load with respect to an individual axis of a robot and the time.

In the step S22, the evaluator 28 determines whether the load exerted on the individual axis speed reducers G1-Gm exceeds the reference value. FIG. 5A is a graph which shows the relationship between the load with respect to an axis of a robot and the time. The load is taken along the ordinate, and the time is taken along the abscissa. And FIG. 5A shows a carved line which represents the load T and a dash line which represents the reference value X0.

An evaluation function f(T) is defined as described below.

$$f(T)=T-X0$$

When f(T) is more than 0, the load T exceeds the reference value. When f(T) is no more than 0, the load (T) does not exceed the reference value. The evaluator 28 uses the evaluation function f(T) to evaluate the load once every specified time period.

In FIG. 5A, a part of the solid line, which represents the load T, exceeds the reference value X0. The evaluator 28 evaluates the load for the individual axis speed reducers G1-Gm, and thus the evaluator 28 can detect in advance a robot axis having a speed reducer which is expected to have a reduced life.

Figure 5B:
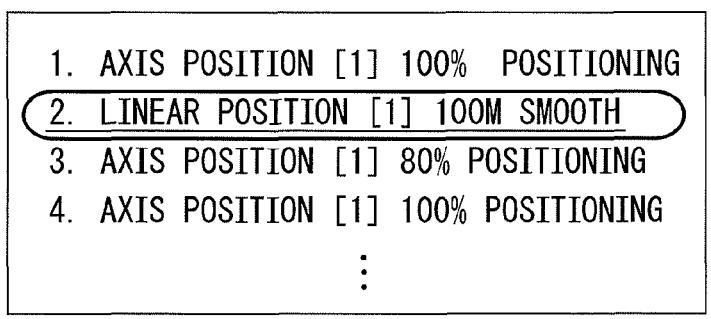
FIG. 5B is a diagram which shows a part of a robot operation program.

When a part of the solid line exceeds the reference value X0, the operation program of the robot 12 is required to be changed for the part in which the load exceeds the reference value X0. FIG. 5B is a diagram which shows a part of the operation program. When the evaluator 28 detects a part in which the load exceeds the reference value X0, the evaluator 28 searches for a program line which corresponds to such part.

Then the detected program line is highlighted. In FIG. 5B, the detected program line is underlined and included within a solid line. It should be appreciated that other approaches may be used. For example, the program line may be highlighted by changing the color. Therefore, an operator can readily rewrite the highlighted program line and modify the program such that the load does not exceed the reference value X0.

Figure 6:
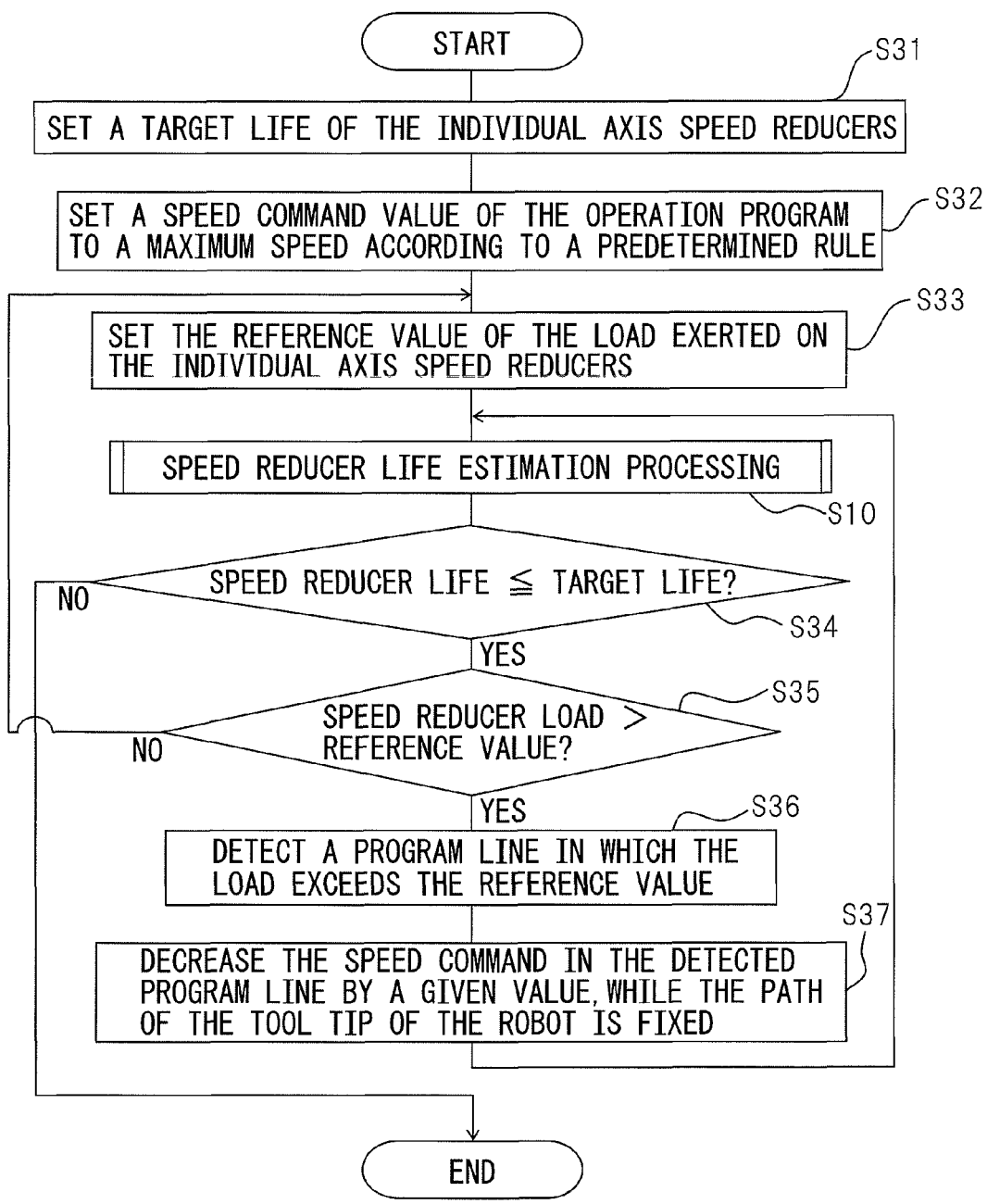
FIG. 6 is a flowchart which shows the third operation of a simulator for estimating a life of a robot speed reducer according to the present invention.

FIG. 6 is a flowchart which shows the third operation of the simulator for estimating a life of a robot speed reducer according to the present invention. In the step S31 shown in FIG. 6, an operator uses the target life setter 29 to set a target life of the individual axis speed reducers G1-Gm.

Then, in the step S32, the maximum speed setter 31 sets the individual speed command values described in the operation program of the robot 12 to a maximum speed according to a predetermined rule.

The predetermined rule on the maximum speed includes, for example, a rule that the speed of the motion of the individual axes can not exceed the maximum speed, a rule that the current flowing through the motors M1-Mm can not exceed the maximum current of the respective motors, a rule that the motors M1-Mm can not have a normalized torque (actual torque divided by maximum torque) more than a given value, a rule that vibration which occurs when the robot 12 is driven can not exceed the limit of the vibration, a rule that the speed reducers G1-Gm can not have a torque which exceeds the rated torque, and the like. Any of these rules may be adopted as the predetermined rule.

When the speed command value is set to the maximum speed, the cycle time required to execute the operation program is minimized. In addition, the path fixer 30 fixes the path of the tool tip of the robot 12. Thus, even when the maximum speed setter 31 changes the speed command value as described above, the path of the tool tip of the robot 12 is not changed.

Furthermore, in the step S33, an operator uses the reference value setter 27 to set the reference value X1 of the load exerted on the individual axis speed reducers G1-Gm. Then the speed reducer life estimation processing S10 is performed as described with reference to FIG. 3. The reference value X1 is the upper limit of the load exerted on the individual axis speed reducers G1-Gm.

Then, in the step S34, it is determined whether the speed reducer life estimated in the speed reducer life estimation processing S10 is not more than the target life. If the estimated life is no more than the target life, the process goes to the step S35. If the estimated life is more than the target life, the process ends. In the step S35, it is determined whether the load T exerted on the individual speed reducers G1-Gm exceeds the reference value X1. This determination and other determinations as described later may be made by the evaluator 28. When the load exerted on the individual speed reducers G1-Gm exceeds the reference value X1, the process goes to the step S36. When the load does not exceed the reference value X1, the process goes back to the step S33.

When the process goes to the step S36, the estimated life of the speed reducers is no more than the target life, and thus the life has to be extended. Therefore, in the step S36, a program line in which the load exerted on the speed reducers exceeds the reference value X1 is detected from the operation program. Then in the step S37, the program changer 32 decreases the speed command value in the detected program line by a given value, while the path of the tool tip of the robot is fixed by the path fixer 30. Because the speed command value is set to the maximum speed in the step S32, the speed command with the maximum speed in the detected program line is decreased by a given value in the step S37.

After that, the process goes back to the step S10 as shown in FIG. 6. The steps S10-S37 are repeated until it is determined in the step S34 that the speed reducer life estimated in the speed reducer life estimation processing S10 is more than the target life.

As described above, in the embodiment illustrated in FIG. 6, the speed command value in a detected program line is gradually decreased from the maximum speed by a given value, and the process is repeated until the estimated life of the speed reducer exceeds the target value. Therefore, this embodiment can simulate a robot operation which meets the speed reducer life requirement and has a shorter cycle time.

In the embodiment shown in FIG. 6, the path fixer 30 fixes the path of the tool tip of the robot 12. Therefore, when the operation program is changed, the changed program is readily applied, which allows reduction of working time in the field.

FIG. 7 is a flowchart which shows the fourth operation of the simulator for estimating a life of a robot speed reducer according to the present invention. In the step S41 shown in FIG. 7, an operator uses the target cycle time setter 33 to set the target cycle time for the operation program of the robot 12.

Then in the step S42, the maximum speed setter 31 sets the speed command values described in the operation program of the robot 12 to a maximum speed according to a predetermined rule. And the path of the tool tip of the robot 12 is fixed by the path fixer 30, so that even when the maximum speed setter 31 changes the speed command value as described above, the path of the tool tip of the robot 12 is not changed. Because the step S42 is similar to the step S32 described above, the detailed description of the step S42 is omitted. After the step S42, the steps S43 and S10 are carried out. The step S43 is similar to the step S33 described above.

Then in the step S44, it is determined whether the cycle time calculated in the speed reducer life estimation processing S10 is shorter than the target cycle time. When the calculated cycle time is shorter than the target cycle time, the process goes to the step S45. When the calculated cycle time is not shorter than the target cycle time, the process ends. The step S45 is similar to the step S35 described above. When the load exerted on the individual speed reducers G1-Gm exceeds the reference value X1, the process goes to the step S46. When the load does not exceed the reference value, the process goes back to the step S43.

When the process reaches the step S46, the calculated cycle time is shorter than the target cycle time, and thus the cycle time has to be extended. Therefore, in the step S46, a program line in which the load exerted on the speed reducers exceeds the reference value X1 is detected. Then in the step S47, the program changer 32 decreases the speed command value in the detected program line by a given value, while the path of the tool tip of the robot is fixed by the path fixer 30. Because the speed command value is set to the maximum speed in the step S42, the speed command with the maximum speed in the detected program line is decreased by a given value in the step S47. After that the process goes back to the step S10 shown in FIG. 7. The process is repeated until the cycle time calculated in the speed reducer life estimation processing S10 in the step S44 does not exceed the target cycle time.

In the embodiment shown in FIG. 7, as described above, the speed command value in a detected program line is gradually decreased from the maximum speed by a given value, and the process is repeated until the calculated cycle time reaches the target cycle time. Therefore, this embodiment can simulate a robot operation which meets the cycle time requirement and includes speed reducers with a longer life.

In the embodiment shown in FIG. 7, the path fixer 30 fixes the path of the tool tip of the robot 12. Therefore, when the operation program is changed, the changed program is readily applied, which allows reduction of working time in the field.

Effects of the Invention

In the first mode, the life of the individual axis speed reducers can be accurately estimated. Thus the preventive maintenance of the individual axis speed reducers can be planned.

In the second mode, a robot axis with respect to which a speed reducer which is expected to have a reduced life is arranged can be detected.

When the speed command value is set to the maximum speed, the cycle time is minimized. In the third mode, the speed command value is gradually decreased from the maximum speed. Therefore, this mode can simulate a robot operation which meets the speed reducer life requirement and has a shorter cycle time. And the path of the tool tip of the robot is fixed. Thus when the operation program is changed, the changed program is readily applied, which allows reduction of working time in the field.

The fourth mode can simulate a robot operation which meets the speed reducer life requirement and has the shortest cycle time.

When the speed command value is set to the maximum speed, the cycle time is minimized. In the fifth mode, the speed command value is gradually decreased from the maximum speed. Therefore, this mode can simulate a robot operation which meets the cycle time requirement and includes speed reducers with a longer life. And the path of the tool tip of the robot is fixed. Thus when the operation program is changed, the changed program is readily applied, which allows reduction of working time in the field.

The sixth mode can simulate a robot operation which meets the cycle time requirement and includes speed reducers with the longest life.

Although the present invention has been described in connection with the typical embodiments, it will be understood by those skilled in the art that these and other various changes, omissions, and additions may be made without departing from the scope of the present invention.

What is claimed is:

1. A simulator for estimating a life of a robot speed reducer, the simulator comprising:
   a controller, wherein the controller is a digital computer with a processor; the controller comprising:
   a rotation speed and load calculator for simulating a robot operation program and calculating the rotation speed of the robot speed reducer arranged with respect to an individual axis of the robot, and the load exerted on the speed reducer for each sampling period;
   a storage for chronologically correlating the rotation speed and the load calculated by the rotation speed and load calculator and storing the rotation speed and the load;
   a speed reducer life calculator for calculating the life of the robot speed reducer arranged with respect to an individual axis of the robot, based on the rotation speed and the load stored in the storage;
   an operating ratio setter for setting an operating ratio of the robot or the data that indirectly represent the operating ratio;
   a speed reducer life estimator for estimating the life of the speed reducer, based on the speed reducer life calculated by the speed reducer life calculator and the operating ratio set by the operating ratio setter;
   a reference value setter for setting a reference value of the load exerted on the speed reducer arranged with respect to an individual axis of the robot;
   an evaluator for determining, by using an evaluation function, whether the load calculated by the rotation speed and load calculator exceeds the reference value set by the reference value setter;
   a path fixer for fixing the path of the tool tip of the robot, regardless of a speed command of the operation program;
   a maximum speed setter for setting a speed command value of the operation program to a maximum speed according to a predetermined rule, while the path is fixed by the path fixer; and
   a program changer for determining, by using the evaluation function, whether the load exerted on the speed reducer which the load is chronologically stored in the storage exceeds the reference value which is set as the upper limit by the reference value setter and, when the load exceeds the reference value, for changing the operation program, with the path fixed by the path fixer, to decrease the speed command value of the operation program from the maximum speed by a given value so that the load exerted on the speed reducer is no more than the reference value.

2. The simulator for estimating a life of a robot speed reducer according to claim 1, the simulator further comprising
   a target life setter for setting a target life of the speed reducer;
   wherein the program changer is repeatedly run until the life of the speed reducer reaches the target value set by the target life setter.

3. The simulator for estimating a life of a robot speed reducer according to claim 2, the simulator further comprising
   a cycle time calculator for multiplying the sample number in the rotation speed and load calculator by the sampling period to calculate the cycle time of the robot operation program,
   wherein when the cycle time calculated by the cycle time calculator is not reduced after the program changer is repeatedly run until the life of the speed reducer reaches the target value set by the target life setter, a new reference value is set by the reference value setter and then the program changer is repeatedly run until the life of the speed reducer reaches the target value set by the target life setter.

4. The simulator for estimating a life of a robot speed reducer according to claim 1, the simulator further comprising
   a cycle time calculator for multiplying the sample number in the rotation speed and load calculator by the sampling period to calculate the cycle time of the robot operation program; and
   a target cycle time setter for setting a target cycle time;
   wherein the program changer is repeatedly run until the cycle time calculated by the cycle time calculator reaches the target value set by the target cycle time setter.

5. The simulator for estimating a life of a robot speed reducer according to claim 4, wherein when the life of the speed reducer is not extended after the program changer is repeatedly run until the cycle time reaches the target value set by the target cycle time setter, a new reference value is set by the reference value setter, and then the program changer is repeatedly run until the cycle time reaches the target value set by the target cycle time setter.

* * * * *